(12) United States Patent
Tucker et al.

(10) Patent No.: US 12,130,199 B2
(45) Date of Patent: Oct. 29, 2024

(54) WEAR ESTIMATION FOR WEAR LINER BEARINGS

(71) Applicant: Bell Textron Inc., Fort Worth, TX (US)

(72) Inventors: Brian E. Tucker, Fort Worth, TX (US); Bryan Kenneth Baskin, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 204 days.

(21) Appl. No.: 17/369,470

(22) Filed: Jul. 7, 2021

(65) Prior Publication Data

US 2023/0008322 A1    Jan. 12, 2023

(51) Int. Cl.
  *G01M 13/04* (2019.01)
  *B64C 13/50* (2006.01)
  *B64C 27/605* (2006.01)

(52) U.S. Cl.
  CPC ........... *G01M 13/04* (2013.01); *B64C 27/605* (2013.01); *B64C 13/503* (2013.01)

(58) Field of Classification Search
  CPC .... G01M 13/04; B64C 27/605; B64C 13/503; B64D 45/00; B64D 2045/0085
  USPC ......................................................... 73/593
  See application file for complete search history.

(56) References Cited

U.S. PATENT DOCUMENTS

| | | | | |
|---|---|---|---|---|
| 4,930,988 A | * | 6/1990 | Griffith | B64C 27/72 416/114 |
| 2013/0136596 A1 | * | 5/2013 | Stamps | F04D 29/362 416/151 |
| 2016/0347479 A1 | * | 12/2016 | O'Neil | B64F 5/60 |
| 2017/0183107 A1 | | 6/2017 | Brookhart et al. | |
| 2020/0256377 A1 | | 8/2020 | Deprouw | |

FOREIGN PATENT DOCUMENTS

| | | |
|---|---|---|
| EP | 2 853 756 A1 | 4/2015 |
| GB | 2 587 608 A | 4/2021 |

OTHER PUBLICATIONS

European Patent Office, "European Search Report," EP Application No. 22170348.1, Sep. 22, 2022, 4 pages, published Munich, Germany.

* cited by examiner

*Primary Examiner* — Lee E Rodak
*Assistant Examiner* — Byung Ro Lee
(74) *Attorney, Agent, or Firm* — Fogarty LLP

(57) ABSTRACT

Embodiments are directed to systems and methods for estimating wear in aircraft rotor systems. Data associated with loads and motions of a swashplate actuator is collected. The swashplate actuator drives a swashplate and at least one control link is coupled to the swashplate. The loads and motions of the at least one control link is estimated based upon the loads and motions of the swashplate actuator. Using a wear model, the current wear of control link components is estimated due to the loads and motions of the at least one control link. Wear estimates for the components are aggregated across multiple flights and used to determine when maintenance actions should occur.

20 Claims, 6 Drawing Sheets

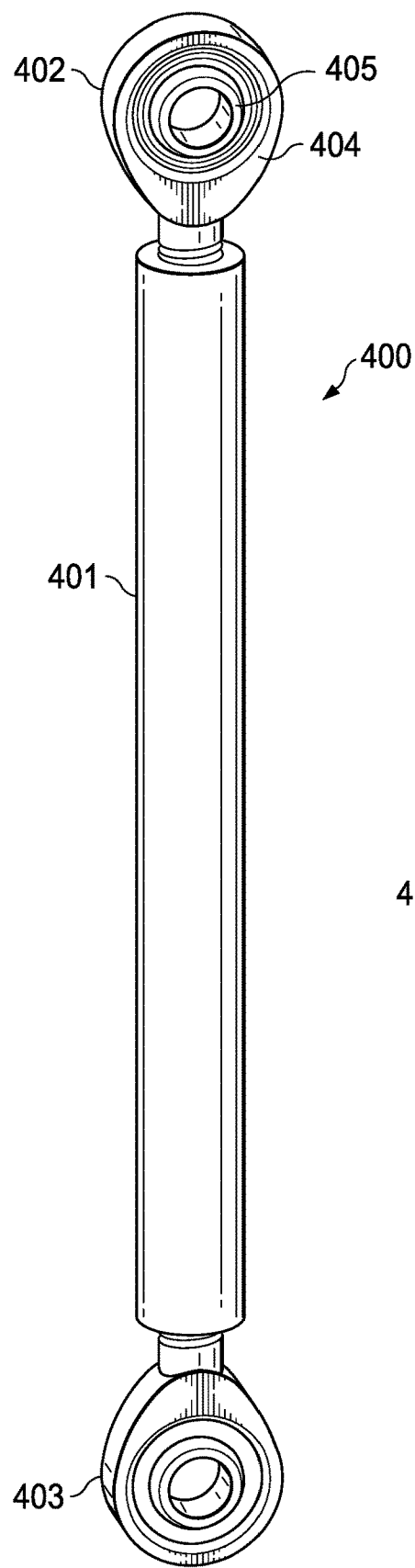
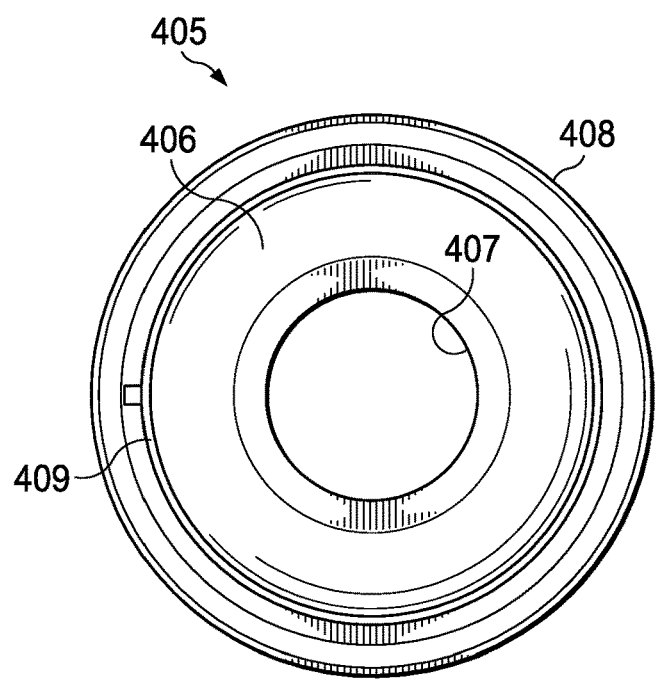
FIG. 4A
FIG. 4B

WEAR ESTIMATION FOR WEAR LINER BEARINGS

BACKGROUND

Aircraft control systems comprise mechanical linkages and equipment connecting cockpit controls to flight control surfaces. Aircraft flight control systems may further comprise sensors, actuators (hydraulic, mechanical, or electrical) and computers. Pitch links, push-pull rods, torque tubes, bell cranks, cables and pulleys are commonly found in conventional mechanical flight control systems. In a rotorcraft, the flight control system controls operation (i.e., pitch) of the rotor blades through a swashplate component. A rotorcraft's flight control system is critical to flight safety. Damage to, or failure of, a flight control system component during flight operations often has serious consequences.

Bearings can be used in a wide variety of aircraft flight control implementations. One conventional implementation is the use of a rod end bearing in a rotor system of a rotorcraft. The rod end can have a liner between the ball and the race in order to reduce friction therebetween. Over time, the liner can wear away and necessitate replacement of the bearing. Conventionally, the amount of wear is detected by measuring the gap between the ball and the race of the bearing. This process is labor intensive and can require special procedures and equipment to perform.

SUMMARY

Embodiments are directed to systems and methods for monitoring loads and motions of a rotor system to estimate wear on components such as bearings. Wear rates are based on traditional wear models, such as the Archard wear equation. Measurements of the rotor system's loads and motions are obtained from swashplate actuator motions and loads. Rotor kinematic models and aircraft body motion data are fused in a pitch link load/motion model. A wear model then estimates bearing liner wear for each flight. The liner wear is accumulated over multiple flights.

BRIEF DESCRIPTION OF THE DRAWINGS

Figure 1:
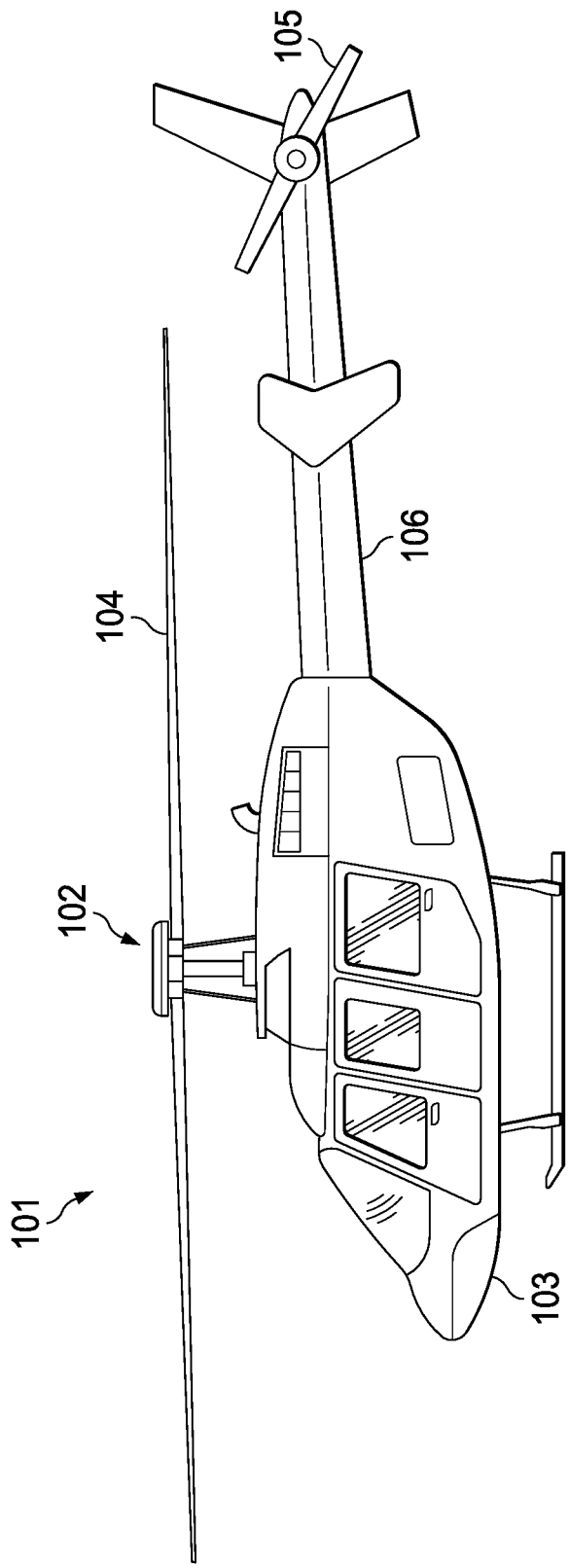

Having thus described the invention in general terms, reference will now be made to the accompanying drawings, which are not necessarily drawn to scale, and wherein:

FIG. 1 is a side view of an example helicopter capable of being used with embodiments of the disclosed system for wear estimation for wear liner bearings.

Figure 2:
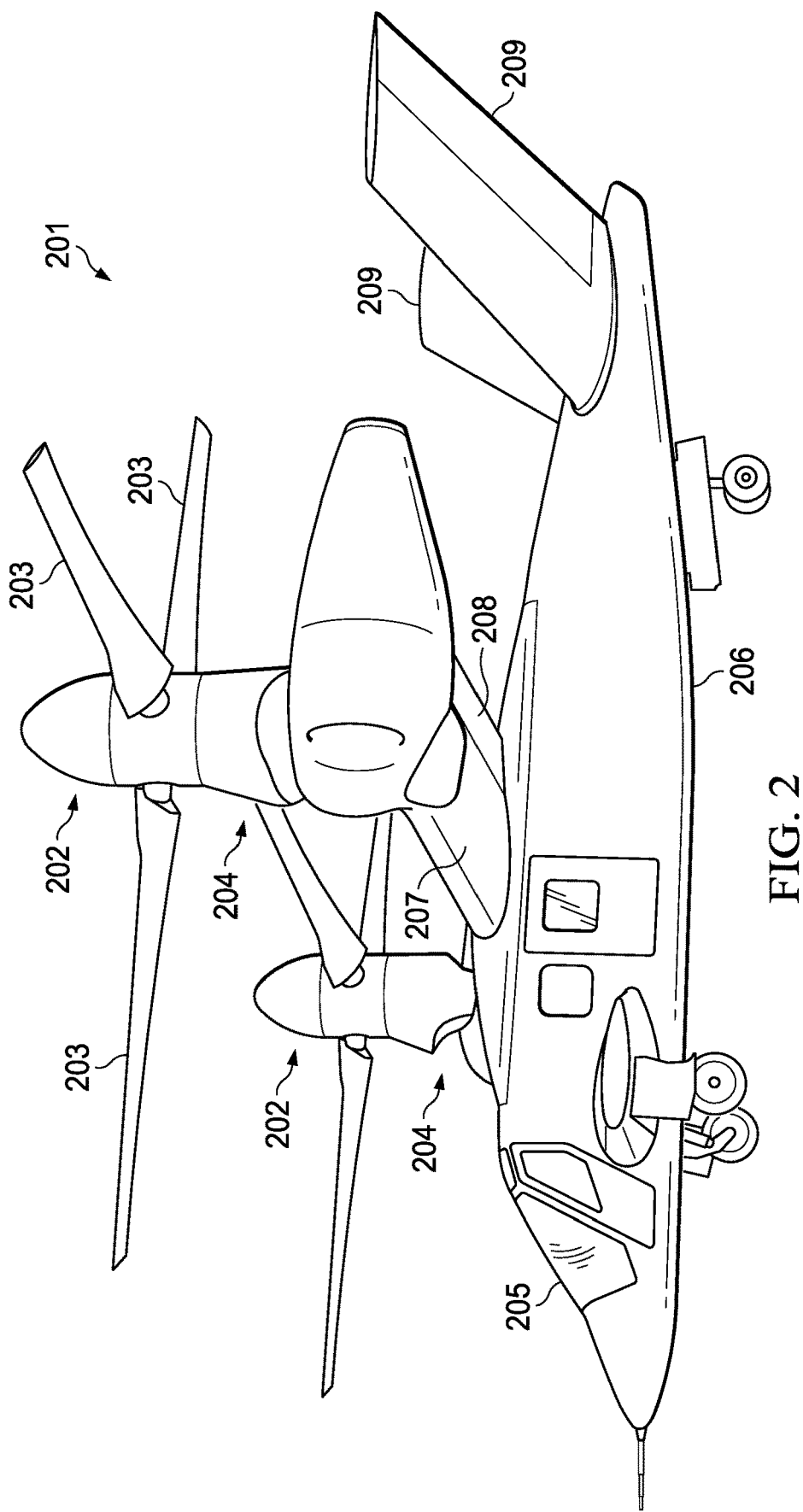

FIG. 2 is an oblique view of an example tiltrotor aircraft capable of being used with embodiments of the disclosed system for wear estimation for wear liner bearings.

Figure 3:
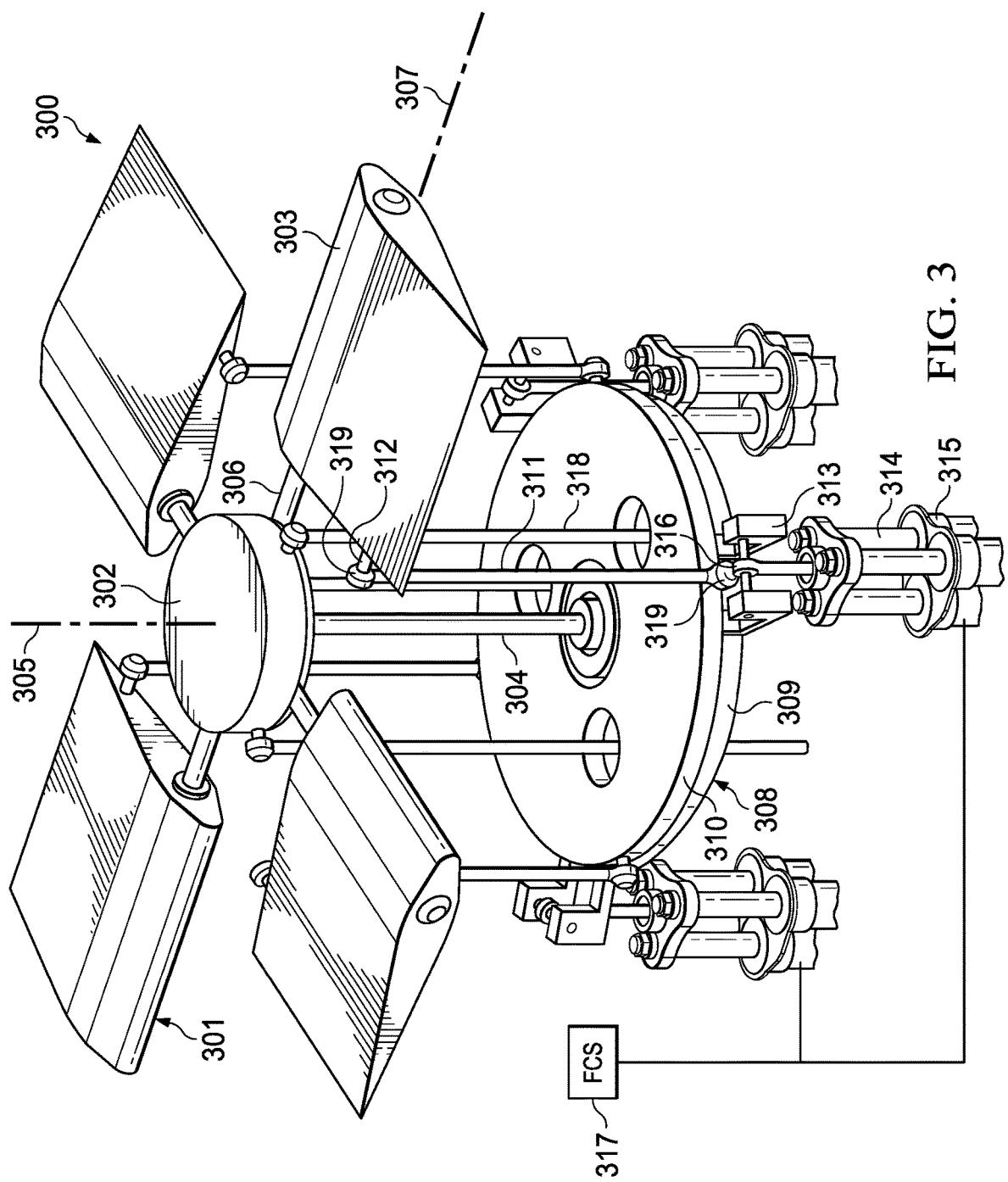

FIG. 3 illustrates an example embodiment of a rotor and control system assembly for use in a rotorcraft.

FIGS. 4A and 4B illustrate details of an example pitch link.

Figure 5:
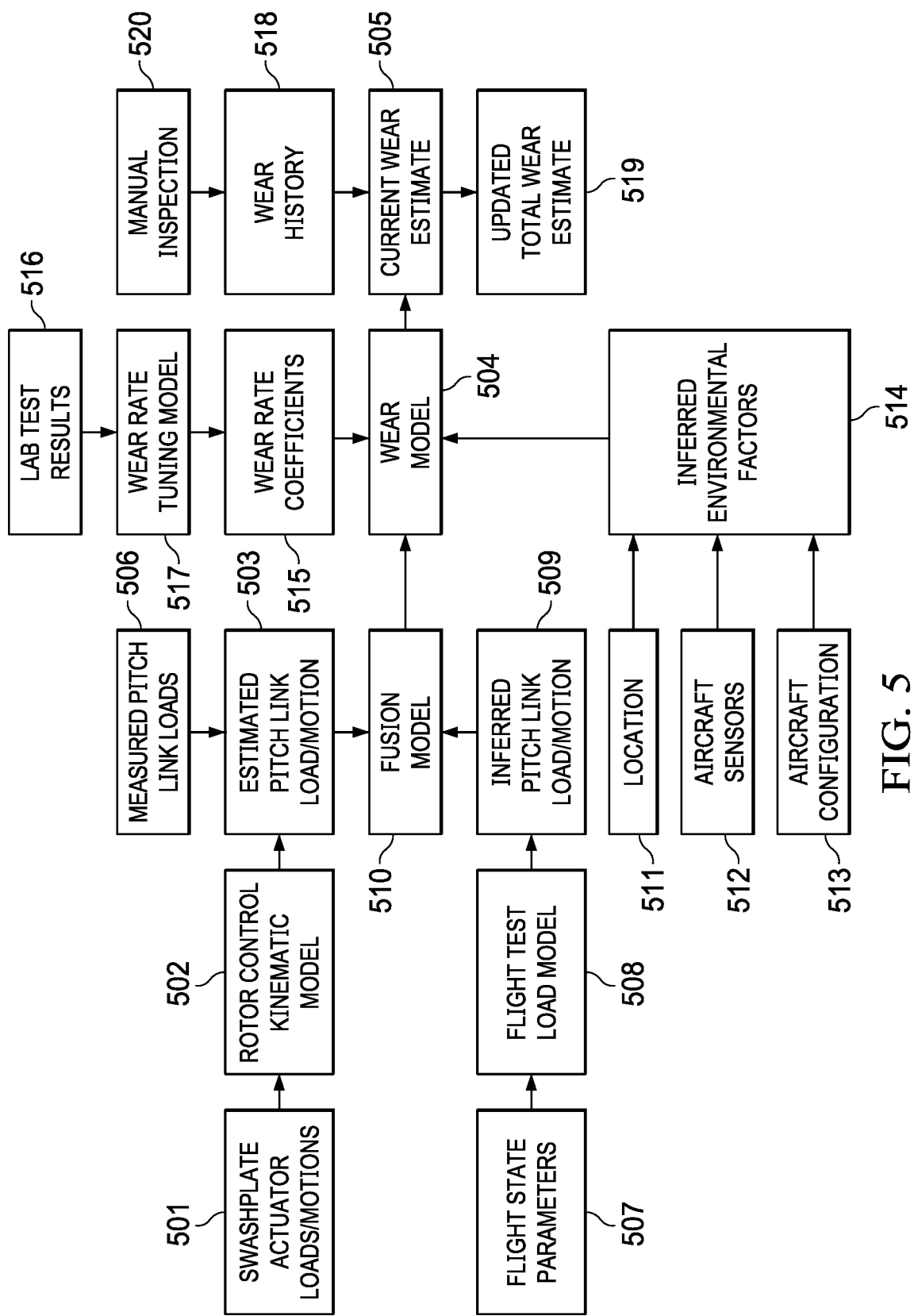

FIG. 5 illustrates a bearing wear estimator according to an example embodiment.

Figure 6:
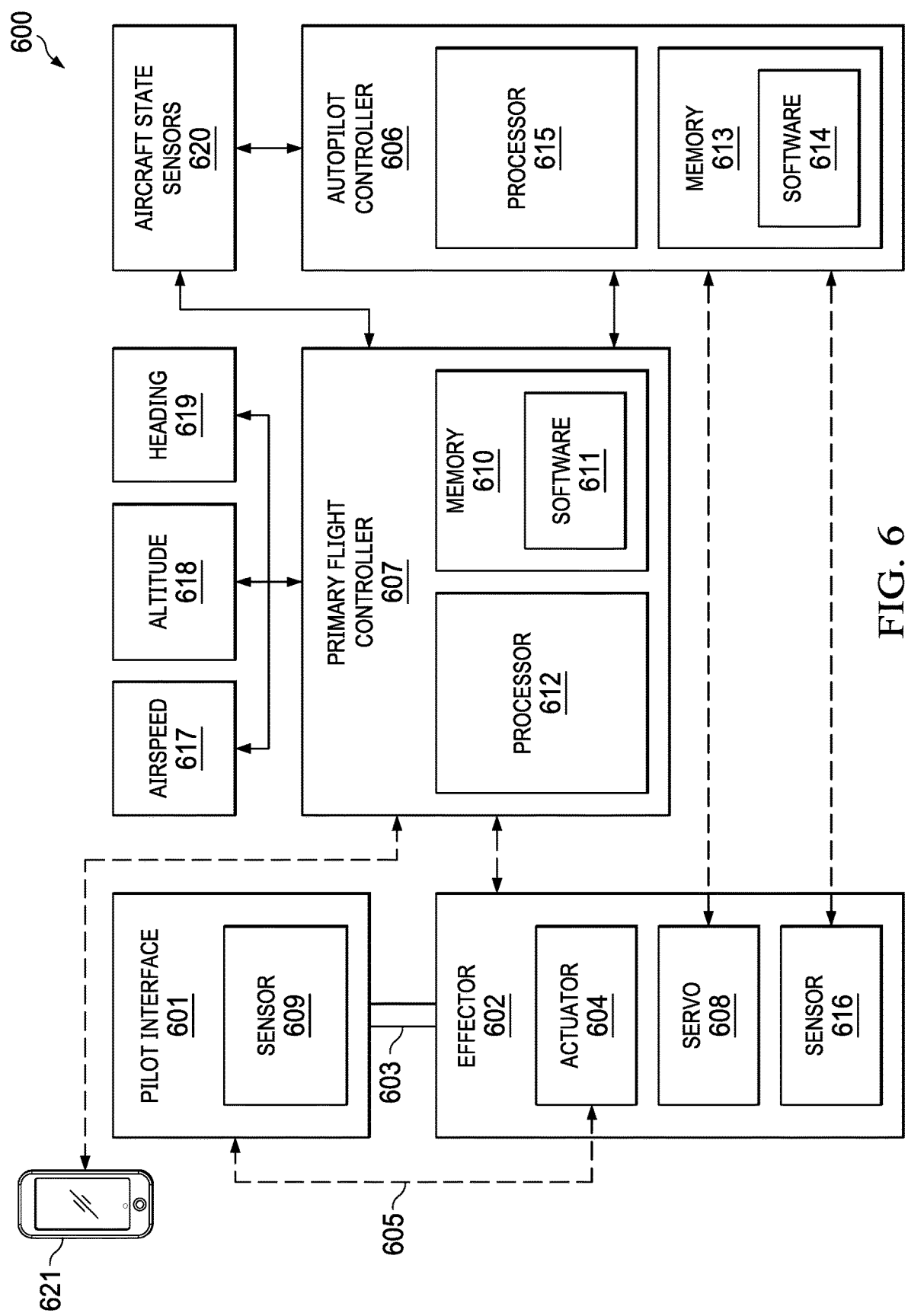

FIG. 6 is a block diagram showing an exemplary flight control system (FCS) capable of supporting a wear estimator application according to one embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIGS. 1 and 2 are schematic diagrams of two different rotorcrafts capable of being used with embodiments of the system for wear estimation of wear liner bearings disclosed herein. FIG. 1 is a side view of an example helicopter 101, while FIG. 2 is an oblique view of an example tiltrotor aircraft 201. Helicopter 101 includes a rotary system 102 carried by a fuselage 103. Rotor blades 104 connected to the rotary system 102 provide lift to enable flight for helicopter 101. The rotor blades 104 are controlled by multiple controllers within fuselage 103. The pitch of each rotor blade 104 can be manipulated to selectively control direction, thrust, and lift of the helicopter 101. For example, during flight a pilot can manipulate a cyclic controller to change the pitch angle of rotor blades 104 and/or manipulate pedals to provide vertical, horizontal, and yaw flight movement. Helicopter 101 can further include an anti-torque system 105 mounted on an empennage 106.

Tiltrotor aircraft 201 includes two or more rotary systems 202 having multiple proprotors 203 and carried by rotatable nacelles 204. The rotatable nacelles 204 provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit 205 of fuselage 206, for causing movement of the aircraft and for selectively controlling the pitch of each blade 203 to control the direction, thrust, and lift of tiltrotor aircraft 201.

Although FIG. 2 shows tiltrotor aircraft 201 in a helicopter mode wherein proprotors 203 are positioned substantially vertical to provide a lifting thrust. It will be understood that in other embodiments, tiltrotor aircraft 201 may operate in an airplane mode wherein proprotors 203 are positioned substantially horizontal to provide a forward thrust. Proprotors 203 may also move between the vertical and horizontal positions during flight as tiltrotor aircraft 201 transitions between a helicopter mode and an airplane mode. Wings 207 may provide lift to tiltrotor aircraft 201 in certain flight modes (e.g., during forward flight) in addition to supporting rotatable nacelles 204 and rotary systems 202. Control surfaces 208 on wings 207 and/or control surfaces 209 on a tail section may be used to adjust the attitude of tiltrotor aircraft 201 around the pitch, roll, and yaw axes while in airplane mode. Control surfaces 208 and 209 may be, for example, ailerons, flaps, slats, spoilers, elevators, or rudders that are controlled by cyclic controllers, pedals or other flight controls within cockpit 205 of fuselage 206.

Embodiments of the present disclosure are not limited to any particular setting or application, and embodiments can be used with a rotor system in any setting or application such as with other aircraft, vehicles, or equipment. It will be understood that aircraft 101 and 201 are used merely for illustration purposes and that any aircraft, including fixed wing, rotorcraft, commercial, military, or civilian aircraft, or any other non-aircraft vehicle may use the system for wear estimation for wear liner bearings as disclosed herein.

FIG. 3 illustrates an example embodiment of a rotor and control system assembly 300 for use in a rotorcraft, such as helicopter 101 (FIG. 1) or tiltrotor aircraft 201 (FIG. 2). Assembly 300 has a rotor 301, comprising a central hub 302 and blades 303 coupled to hub 302. Blades 303 and hub 302 rotate with a mast 304 about a mast axis 305. Each blade 303 is coupled to hub 302 by arms 306, which may be discrete members or components of a yoke assembly. In the embodiment shown, hub 302 is configured to gimbal relative to mast 304, allowing for out-of-plane flapping motions of blades 303, in which blades 303 on opposite sides of hub 302 move in opposite directions. Each blade 303 is also configured for rotation relative to hub 302 about a pitch axis 307.

A swashplate 308 comprises a nonrotating plate 309 and a rotating plate 310, with plate 310 being free to rotate in one degree of freedom relative to plate 309 while motions of plate 309 are transferred to plate 310. A pitch link 311 couples rotating plate 310 to a pitch horn 312 of each blade 303, allowing for swashplate 308 to control the pitch of blades 303. Pitch links 311 transfer pitch changes from swashplate 308 to pitch horns 312. During operation, pitch link 311 can endure a high frequency of cycles. While shown as being behind axis 307 relative to the direction of rotation of rotor 301, pitch horns 312 may alternatively be located forward of axis 307. Swashplate 308 is configured for translation along and relative to mast 304 for collective control of blade pitch, and swashplate 308 is configured for tilting relative to mast 304 for cyclic control of blade pitch. Clevises 313 on nonrotating plate 309 are coupled with control rods 314 to pitch control actuators 315, which are configured to control the motion of swashplate 308 in response to inputs by a pilot and/or flight-control system (FCS) 317. Control rods 314 are coupled to devises 313 with a pitch control connector or bearing 316. Rods 318 may optionally be used to transfer flapping motion of hub 302 to sensors (not shown) for measuring and communicating to FCS 317 the magnitude and direction of flapping motions, or flapping motion may be measured and communicated to FCS 317 by sensors (not shown) within hub 302. In some embodiments, FCS 317 may be part of a fly-by-wire (FBW) system that sends electrical signals to actuators 315 to control flight of the rotorcraft. The FBW system may assist pilots in stably flying the rotorcraft and reduce pilot workload. The FBW system may also operate with an autopilot system to control the rotorcraft.

To allow for electronic control of the pitch angle of blades 303, assembly 300 may incorporate linear actuators 315, which may be electric, hydraulic, or electrohydraulic. Control rods 314 are installed within each actuator 315, allowing for FCS 317 to operate actuator 315 to alter the length of each rod 314. An advantage to having actuators in the non-rotating portion is that no hydraulic or electrical slip ring is needed to cross the gap to the rotating system. In alternative embodiments, each linear actuator 315 may be located at one end of the associated pitch link 311 or control rod 314 for altering the axial position of pitch link 311 relative to swashplate 308 or pitch horn 312 or control rod 314 relative to swashplate 308.

In the rotating system, sensors may measure forces and motion in assembly 300, such as flapping, shear forces on the hub, forces on pitch links 311, and control rods 314. These forces may be communicated to FCS 317 for use in determining loads experienced by assembly 300 during operation.

FIGS. 4A and 4B illustrate an example pitch link 400 in further detail. Pitch link 400 can include a link body 401 coupled between a first rod end 402 and a second rod end 403, which are substantially similar to each other. Rod end 402 can include a housing 404 adapted for securing a bearing 405 therein. In the illustrated embodiment, bearing 405 is swaged into housing 404; however, it should be appreciated that bearing 405 can be coupled into housing 404 in other ways, such as adhesive bonding. In another embodiment, bearing 405 is integral with housing 404. Bearing 405 is illustrated as a spherical type bearing for exemplary purposes.

An example embodiment of bearing 405 is illustrated in further detail in FIG. 4B. Bearing 405 can include ball 406 having an attachment hole 407 located therethrough. Attachment hole 407 may be coupled, for example, to a pitch horn 312, swashplate 308, or clevis 313 (FIG. 3) through a bolt. Ball 406 fits within a race 408 that has an interior spherical surface with a liner 409 thereon. An outer surface of race 408 has an outer diameter that is configured for securely locating within a component or structure, such as housing 404 of rod end 402, for example. Ball 406 is configured to rotate in relation to liner 409, such that the outer surface of ball 406 rubs against the friction surface of liner 409. Liner 409 is preferably made with a material having a low coefficient of friction, such as polytetrafluoroethylene (PTFE), polyethylene terephthalate (PET), or polyester.

Liner 409 is a sacrificial material that wears out over time due to use, such as cycling of pitch links 311. It is important that liner 409 does not wear completely through, which would lead to fretting of the structural components such as race 408 and housing 404. Fretting can lead to fatigue failures at the rod ends 402, 403 of link 401, which in turn can affect the operation and integrity of rotor and control system assembly 300. Traditionally, a wear liner component like liner 409 is subject to routine maintenance inspections, such as measuring any gap between liner 409 and ball 406 using a feeler gauge. Once the gap reaches a threshold amount, the bearing 405 or the link 401 is replaced. It is difficult to predict when liner 409 will fail. Wear is dependent on the flight and environmental conditions in which the liner is used, which can vary on each flight. Wear trends for each bearing 405 are typically not recorded due to the number of bearings used in the flight control system, which would require time consuming manual measuring and recording of wear amounts for each bearing. Accordingly, it has been difficult to predict when bearings will wear out in existing flight control systems. Once a bearing replacement is required, such as due to excessive wear, repairs may be delayed if replacement parts are not readily available.

FCS 317 or other monitoring systems may monitor loads and motions of the rotor system, such as rotor and control system assembly 300, to estimate wear in the bearings and other components. FCS 317 controls and monitors the position and load at actuators 315, which allows it to collect data related to the load on bearings and other components of the flight control system. Additionally, FCS 317 may collect aircraft body motion data, such as pitch, roll, and yaw rates, and may measure the acceleration loads experienced by the aircraft. FCS 317 may further collect environmental data, such as air temperature, humidity, air particulate measurements, and other parameters that may affect bearing wear rates. FCS 317 collects this data during each flight and estimates how much wear the bearings and/or other flight control components have experienced during the flight. For example, kinematic models of the rotor system allow FCS 317 to estimate the loads and motions on pitch links 311 and pitch control connectors or bearings 316 as well as the wear resulting from those loads and motions. The accumulated wear data over multiple flights is evaluated to determine whether to inspect and/or replace the bearings and/or other flight control components.

FIG. 5 illustrates a bearing wear estimator 500 according to an example embodiment. Wear estimator 500 may be a process that runs on a flight control computer or other processor in a fly-by-wire system. Swashplate actuator loads and motions 501 are collected and provided to a rotor control kinematic model 502. Empirical testing of the swashplate and rotor system may be used to develop the rotor control kinematic model 502. Alternatively, rotor control kinematic model 502 may be developed by applying physics to computer models of the swashplate and rotor system. Estimated pitch link load and motion 503 are generated by rotor control kinematic model 502 based upon the swashplate actuator loads and motions 501. For example, referring to FIG. 3, FCS 317 may observe the loads and motions of actuators 315, which are driving the lower non-rotating side 309 of the swashplate 308. This causes motion of pinch links 311 attached to the upper rotating side 310 of swashplate 308. Pitch links 311 typically have bearings on either end 319. Additionally, control rods 314 have connectors or bearings 316. The loads and motion of actuator 315 may be used to estimate the load and motion of connectors or bearings 319, 316 using the rotor control kinetic model 502. The actuator tells FCS 317 how much it is moving, which indicates how much swashplate 308 is tilting, and which in turn relates to the travel of bearings 319 and the movement of the bearing ball 406 against 409 liner at a given load.

The estimated pitch link load/motion 503 is provided to a wear model 504. Wear rates are based on traditional wear models 504, such as the Archard wear equation. The wear model 504 may, for example, describe sliding wear based on asperity contact, wherein the volume of debris removed due to wear is proportional to work done by friction forces. Wear model 504 provides a current wear estimate 505, which may be calculated for a discrete time interval or for an entire flight.

In some embodiments, the estimated pitch link load/motion data 503 may be supplemented or replaced by measured pitch link load data 506. Such measured data may be obtained directly from measuring strain on pitch links 311, for example.

In other embodiments, the input to wear model 504 may also include data related to flight state parameters 507 that affect the load on bearings in the flight control system. For example, some rotorcraft motion, such as banking, turning, pulling up, or pushing over, will induce higher loads on the bearings due to acceleration forces compared to straight and level flight. The flight state parameters 507 are applied to a flight test load model 508, which generates inferred pitch link load/motion data 509. Similar to development of the rotor control kinematic model 502, empirical testing of the aircraft, swashplate, and rotor system may be used to develop flight test load model 508. Alternatively, computer modeling may be used to develop a flight load model of the aircraft, swashplate, and rotor system. The estimated pitch link load/motion data 503 can be fused with the inferred pitch link load/motion data 509 to create a combined input to wear model 504 or used independently. A fusion model 510 may be used to combine estimated pitch link load/motion data 503 and inferred pitch link load/motion data 509. Fusion model 510 may be used, for example, to scale or balance the relative values of the estimated pitch link load/motion data 503 and inferred pitch link load/motion data 509 to create the input to wear model 504.

In further embodiments, wear model 504 may also receive environmental inputs. The location 511 in which the rotorcraft is operating may affect the wear model 504. Location 511 may be manually entered by a pilot or may be determined using navigation aids or GPS location data. Location 511 may identify an operating conditions, such as desert or at—sea environments, that have a higher likelihood of bearing exposure to sand or salt air corrosion. For example, certain locations may be identified using geofencing, or other designations to indicate higher likelihood of wear due to environmental conditions. Aircraft sensors 512 may provide wear-related data, such as airborne particulate measurements, humidity, or other atmospheric conditions that are relevant to bearing wear.

Aircraft configuration data 513 may also indicate a relative risk of bearing wear. For example, in a landing configuration, the flight control system may be more likely to be exposed to blowing dust and sand. Other aircraft configurations, such as a degree of tilt for tiltrotors may indicate whether the aircraft is operating close to the ground or at altitude. For example, tiltrotors aligned vertically suggest slower speed operations close to the ground or hovering, while tiltrotors aligned horizontally suggest operations at altitude and at higher speed. The location 511, sensor 512, and configuration 513 data is used to generate inferred environmental factors 514.

In some aircraft, an inlet barrier filter that is selectively placed in the path of the engine intake airflow. At high altitudes, the inlet filter is not needed since there is less likelihood of exposure to airborne particulate matter, so an inlet filter bypass door may be opened to increase the volume of inlet air available to the engine. On the other hand, at low altitudes when operating closer to the ground, a pilot may close the bypass door and force the intake air to go through the barrier filter. If the pilot has indicated a concern regarding the operating environments impact on the engine, then it can be inferred that the environment may also affect the bearings other flight control components for the similar reasons. The position of an engine inlet bypass door, which may be determined by a sensor 512 or cockpit switch position, indicates whether an air filter is needed. This information may also be provided to generate inferred environmental factors 514.

Wear model 504 may also receive wear rate coefficients 515. The wear rate coefficients 515 may be generated using, for example, lab test results 516 that are applied to a tuning model 517. More than one wear rate coefficient 515 may be provided. For example, wear rate coefficients 515 may relate to different environmental conditions or different rotorcraft operating conditions.

The current wear estimate 505 generated by wear model 504 may be combined with an existing wear history 518 for the rotorcraft. Wear history 518 is the total of estimated bearing wear from prior flights, and when added to the current wear estimate 505 for a current flight, an updated total wear history estimate 519 is created for the rotorcraft. The updated total wear history estimate 519 may be compared to a threshold wear amount that drives maintenance actions. In one embodiment, when a first estimated wear threshold is achieved, then a replacement part availability is verified and a replacement bearing or other flight control component is noted as in-stock or is ordered. When a second estimated wear threshold is achieved, a maintenance inspection is scheduled to evaluate the actual wear on a bearing or other flight control component. Estimated wear trends may also be observed to determine if certain bearings or components are subject to excessive wear due to current operating or environmental conditions.

In some embodiments, when a manual inspection 520 is completed by a maintenance team, the wear history 518 is further updated with actual wear measurements to provide accurate data for wear estimate updates on future flights.

FIG. 6 is a block diagram showing an exemplary flight control system (FCS) 600 for a fly-by-wire (FBW) aircraft. FCS system 600 may be used to monitor loads and motions in a flight control system and to estimate wear of aircraft components. System 600 may be implemented on any aircraft having a control surface controllable via a pilot interface and/or an autopilot controller for providing automatic control of the control surface. A pilot interface 601 receives control inputs from a pilot for transmitting the control inputs to an effector 602, such as a swashplate, rotor, propellor, control surface, etc. The control inputs may be transmitted directly to effector 602 via a mechanical linkage 603, or control signals may be transmitted to an actuator 604 of effector 602 via a signaling path 605 (e.g., in a fly-by-wire arrangement), or some combination of these may be employed. Mechanical linkage 603 may be, for example, a pitch link or a pitch control connector. Actuator 604 may be, for example, a hydraulically powered or electrically powered actuator that responds to electrical control signals from pilot interface 601 or from a flight control computer (FCC), such as autopilot controller 606, flight controller 607, flight director, waypoint navigator, navigation computer, or other navigation solution.

Autopilot controller 606 may receive input commands from a flight controller 607 and transmit commands to a servo 608 adapted to drive effector 602 based on the input commands. Servo 608 may drive effector 602 directly or may drive mechanical linkage 603 or actuator 604. Effector 602 is for example one or more of an aileron, elevator, horizontal stabilizer, flap, slat, spoiler, or rudder. Alternatively, effector 602 may represent an engine control, rotor blade actuator, or proprotor configuration actuator. Although only one effector 602 is depicted in FIG. 6 for clarity of illustration, in practice system 600 is used to control a plurality of effectors onboard an aircraft via at least one autopilot servo (e.g., a pitch control servo for a swashplate).

Pilot interface 601 may be, for example, a control wheel, center stick, yoke, or other interface located onboard the aircraft or remotely (e.g., by a pilot of an unmanned aerial vehicle (UAV)). In certain embodiments, pilot interface 601 includes a first interface for a pilot and a second interface for a copilot (not shown), with the first and second interfaces configured to move in concert via one or more mechanical linkages (e.g., a pitch mechanical linkage). In some embodiments, mechanical linkage 603 includes a known mechanical gearing that mechanically couples pilot interface 601 with servo 608. During autopilot operation, pilot interface 601 may move according to command inputs implemented by autopilot controller 606 via mechanical linkage 603.

A sensor 609 is mechanically coupled to pilot interface 601 for measuring a position of pilot interface 601. For example, sensor 609 may be one or more rotary variable differential transformers (RVDTs) used to measure rotations of pilot interface 601 (e.g., a control wheel rotation and/or a control stick pivot angle). In certain embodiments, sensor 609 includes a plurality of RVDTs configured as a set for determining an angle in a three-axis (e.g., X, Y, Z) space for commanding aircraft motions.

Flight controller 607 has a memory 610, including a non-transitory medium for storing software 611, and a processor 612 for executing instructions of software 611. Memory 610 in some embodiments is a memory system that includes both transitory memory such as RAM and non-transitory memory such as, ROM, EEPROM, Flash-EEPROM, magnetic media including disk drives, and optical media. Memory 610 stores software 612 as machine readable instructions executable by processor 612. In certain embodiments, flight controller 607 includes one or more flight computers (e.g., a primary flight computer and a backup flight computer). Flight controller 607 is configured to communicate with pilot interface 601, sensor 609, autopilot controller 606, effector 602, and actuator 604 by one of a wired and/or wireless communication medium.

Autopilot controller 606 has a memory 613, including a non-transitory medium for storing software 614, and a processor 615 for executing instructions of software 614. In certain embodiments, autopilot controller 606 includes one or more microprocessor, microcontroller, programmable logic controller, and printed circuit boards. Autopilot controller 606 is adapted to communicate with servo 608 and flight controller 607 by one of a wired and/or wireless communication medium. In certain embodiments, autopilot controller 606 and servo 608 are implemented as an integrated autopilot servo device, such as a roll autopilot servo for driving effector 602 (e.g., a roll spoiler and/or an aileron) for providing roll function. Autopilot controller 607 determines command signals for commanding servo 608 based on a bank angle and/or a roll rate (e.g., from sensor 609 or primary flight controller 607), and in some embodiments, based on air data from controller 607.

Exemplary instructions of software 611 and/or 614 may include a wear estimator application for performing functions as illustrated by wear estimator 500 (FIG. 5) and as further described herein. During or after a flight, the wear estimator application may run to estimate an amount of bearing or other flight control wear during that flight. In certain embodiments, the wear estimator application may receive information regarding the position of mechanical linkage 603, effector 602, actuator 604, or servo 608 in order to determine the loads and motions experienced by bearings in the flight control system. For example, a sensor 616 may be coupled with servo 608 for determining a position of servo 608 and actuator 604. For example, sensor 616 may be a set of hall-effect sensors positioned around an electrical motor shaft of servo 608 for determining an angular rotation position of the electrical motor shaft. Alternatively, sensor 616 may be coupled to mechanical linkage 603 for determining the motion of and loads on linkage 603. In some embodiments, servo 604 drives a pitch controller for a swashplate, and sensor 616 may be used to determine the motion of and loads on linkage 603.

The wear estimator application may also receive aircraft flight parameters, for example, airspeed sensor 617, altitude sensor 618, and heading sensor 619. Sensors 617-619 may be associated with an aircraft pitot static system, compass, GPS, navigation system, accelerometers, etc. Other sensors 620 may also be used to provide aircraft state data, such as the configuration of landing gear, engine inlet bypass doors, tiltrotor angle, and the like. Memory 610 may hold additional data and parameters required by the wear estimator application, such as wear rate coefficients and a wear history including wear estimates for prior flights. A user, such as maintenance personnel, may access the wear estimate data by connecting to flight controller 607 directly or wirelessly using a tablet 621 or other device. Alternatively, wear estimate data may be accessed from a display in the aircraft cockpit or in an avionics bay. The wear estimator application may provide an updated total wear estimate 519 after each flight and/or may provide a current wear estimate 505 that can be combined with a separately stored wear history 518 by maintenance personnel. One or more thresholds may be set so that certain actions are triggered when updated total wear estimate 519 exceeds the thresholds. For example, thresholds may be set to trigger the scheduling of maintenance inspections or the ordering of replacement parts. In some embodiments, an excessive or unexpected current wear estimate 505 after a single flight may trigger the scheduling of a maintenance inspection.

In an example embodiment, a method for estimating wear in aircraft rotor systems comprises collecting data associated with motion of a swashplate actuator. The swashplate actuator drives a swashplate and at least one control link is coupled to the swashplate. The method further comprises estimating the loads and motions of the at least one control link based upon the loads and motions of the swashplate actuator. The method then estimates current wear of control link components due to the loads and motions of the at least one control link using a wear model. The at least one control link may be a pitch link. The control link components may be bearing wear liners on the at least one control link. The swashplate actuator is coupled to a non-rotating section of the swashplate and the at least one control link is coupled to a rotating section of the swashplate.

The method may further comprise measuring loads on the at least one control link and estimating the loads and motions of the at least one control link based upon the measured loads.

The method may further comprise collecting data associated with aircraft flight state, estimating the loads and motions of the at least one control link based upon the aircraft flight state, merging estimates of control link loads and motions based upon the loads and motions of the swashplate actuator and estimates of control link loads and motions based upon the aircraft flight state to create a wear model input, and using the wear model, estimate the current wear of the control link components due the merged estimates of control link loads and motions.

The method may further comprise monitoring aircraft data, estimating environmental conditions based upon the aircraft data, and compensating, by the wear model, for the estimated environmental conditions when estimating the current wear of the control link components. The aircraft data may be associated with one or more of an aircraft location, aircraft sensors, and an aircraft configuration. The aircraft may comprise a bypass for an engine inlet filter, wherein the aircraft data comprises information regarding whether or not the bypass is selected.

The method may further comprise storing data associated with a wear history of the control link components and updating the wear history with the estimate of current wear of the control link components.

In another embodiment, an aircraft comprises a rotor system having a swashplate, a swashplate actuator coupled to a non-rotating section of the swashplate, and at least one control link coupled to a rotating section of the swashplate. A flight control computer is configured to estimate wear in rotor system components. The flight control computer comprises one or more processors and a memory. The memory stores instructions for executing a wear estimation application. The instructions cause the flight control computer to perform the steps of collecting data associated with loads and motions of the swashplate actuator, estimating the loads and motions of the at least one control link based upon the loads and motions of the swashplate actuator, and using a wear model, estimate current wear of control link components due to the loads and motions of the at least one control link. The control link components may be bearing wear liners on the at least one control link.

The instructions may further cause the flight control computer to perform the steps of measuring loads on the at least one control link and estimating the loads and motions of the at least one control link based upon the measured loads.

The instructions may further cause the flight control computer to perform the steps of collecting data associated with aircraft flight state, estimating the loads and motions of the at least one control link based upon the aircraft flight state, merging estimates of control link loads and motions based upon the loads and motions of the swashplate actuator and estimates of control link loads and motions based upon the aircraft flight state to create a wear model input, and using the wear model, estimate the current wear of the control link components due the merged estimates of control link loads and motions.

The aircraft may further comprise one or more sensors for monitoring aircraft data. The instructions may further cause the flight control computer to perform the steps of estimating environmental conditions based upon the aircraft data, and compensating, by the wear model, for the estimated environmental conditions when estimating the current wear of the control link components. The aircraft data may be associated with one or more of an aircraft location, aircraft sensors, and an aircraft configuration.

The aircraft may comprise a bypass for an engine inlet filter, and the aircraft data may comprise information regarding whether or not the bypass is selected.

The instructions may further cause the flight control computer to perform the steps of storing, in the memory, data associated with a wear history of the control link components and updating the wear history with the estimate of current wear of the control link components.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for estimating wear in aircraft rotor systems, comprising:
   collecting, by a flight control computer of a flight control system of a fly-by-wire aircraft, from a linear electric, hydraulic, or electrohydraulic swashplate actuator, loads and motions of the swashplate actuator to drive a swashplate, and wherein at least one control link is coupled to the swashplate;
   estimating, by the flight control computer, using the loads and the motions of the swashplate actuator to drive the swashplate, loads and motions of the at least one control link;
   collecting, by the flight control computer, data associated with overall motions or maneuvers performed by the aircraft during flight;
   estimating, by the flight control computer, the loads and motions of the at least one control link based upon the overall motions or maneuvers;
   merging, by the flight control computer, estimates of control link loads and motions based upon the loads and motions of the swashplate actuator and estimates of control link loads and motions based upon the overall motions or maneuvers to create a wear model;
   using the wear model, by the flight control computer, estimating current wear of control link components due to the loads and motions of the at least one control link; and
   displaying, by the flight control computer, a resulting current wear estimate of control link components in a cockpit and/or avionics bay of the aircraft.

2. The method of claim 1, wherein the at least one control link comprises a pitch link.

3. The method of claim 1, wherein the control link components comprise bearing wear liners on the at least one control link.

4. The method of claim 1, wherein the swashplate actuator is coupled to a non-rotating section of the swashplate and wherein the at least one control link is coupled to a rotating section of the swashplate.

5. The method of claim 1, further comprising:
   measuring loads on the at least one control link; and
   estimating the loads and motions of the at least one control link based upon the measured loads.

6. The method of claim 1, wherein the overall motions or maneuvers comprise at least one of a banking motion, a turning motion, a pulling up motion, a pushing over motion, or a level flight motion.

7. The method of claim 1, further comprising:
   monitoring aircraft data;
   estimating environmental conditions based upon the aircraft data; and
   estimating current wear of control link components due to the loads and motions of the at least one control link, by the wear model, based on resulting estimated environmental conditions.

8. The method of claim 7, wherein the aircraft data is associated with one or more of an aircraft location, aircraft sensors, and an aircraft configuration.

9. The method of claim 7, wherein the aircraft comprises a bypass for an engine inlet filter, and wherein the aircraft data comprises information regarding whether or not the bypass is selected.

10. The method of claim 1, further comprising:
    storing data associated with a wear history of the control link components; and
    updating the wear history with the estimate of current wear of the control link components.

11. An aircraft, comprising:
    a rotor system comprising a swashplate, a linear electric, hydraulic, or electrohydraulic swashplate actuator coupled to a non-rotating section of the swashplate, and at least one control link coupled to a rotating section of the swashplate; and
    a flight control computer configured to estimate wear in rotor system components, the flight control computer comprising one or more processors and a memory, wherein the memory stores instructions for executing a wear estimation application, the instructions causing the flight control computer to perform the steps of:
       collecting, from the swashplate actuator, loads and motions of the swashplate actuator to drive the swashplate;
       estimating, using the loads and motions of the swashplate actuator to drive the swashplate, loads and motions of the at least one control link;
       collecting data associated with overall motions or maneuvers performed by the aircraft during flight;
       estimating the loads and motions of the at least one control link based upon the overall motions or maneuvers;
       merging estimates of control link loads and motions based upon the loads and motions of the swashplate actuator and estimates of control link loads and motions based upon the overall motions or maneuvers to create a wear model; and
       using the wear model, estimating current wear of control link components due to the loads and motions of the at least one control link.

12. The aircraft of claim 11, wherein the control link components comprise bearing wear liners on the at least one control link.

13. The aircraft of claim 11, wherein the instructions further causing the flight control computer to perform the steps of:
    measuring loads on the at least one control link; and
    estimating the loads and motions of the at least one control link based upon the measured loads.

14. The aircraft of claim 11, wherein the overall motions or maneuvers comprise at least one of a banking motion, a turning motion, a pulling up motion, a pushing over motion, or a level flight motion.

15. The aircraft of claim 11, further comprising:
    one or more sensors for monitoring aircraft data; and
    wherein the instructions further causing the flight control computer to perform the steps of:
       estimating environmental conditions based upon the aircraft data; and compensating estimating current wear of control link components due to the loads and motions of the at least one control link, by the wear model, based on resulting estimated environmental conditions.

16. The aircraft of claim 15, wherein the aircraft data is associated with one or more of an aircraft location, aircraft sensors, and an aircraft configuration.

17. The aircraft of claim 15, wherein the aircraft comprises a bypass for an engine inlet filter, and wherein the aircraft data comprises information regarding whether or not the bypass is selected.

18. The aircraft of claim 11, wherein the instructions further causing the flight control computer to perform the steps of:

storing, in the memory, data associated with a wear history of the control link components; and updating the wear history with the estimate of current wear of the control link components.

19. A non-transitory medium having machine readable instructions executable by a flight control computer stored thereupon, the machine readable instructions, upon execution by the flight control computer, cause the flight control computer to:

estimate wear in rotor system components, by:

collecting, from a linear electric, hydraulic, or electro-hydraulic swashplate actuator, loads and motions of the swashplate actuator to drive a swashplate;

estimating, using the loads and motions of the swashplate actuator to drive the swashplate, loads and motions of the at least one control link;

collecting data associated with overall motions or maneuvers performed by the aircraft during flight;

estimating the loads and motions of the at least one control link based upon the overall motions or maneuvers;

merging estimates of control link loads and motions based upon the loads and motions of the swashplate actuator and estimates of control link loads and motions based upon the overall motions or maneuvers to create a wear model; and using the wear model, estimating current wear of control link components due to the loads and motions of the at least one control link.

20. The non-transitory medium of claim 19, wherein, upon execution by the flight control computer, the machine readable instructions cause the flight control computer to observe loads and motions of the swashplate actuator, collecting the loads and motions of the swashplate actuator to drive the swashplate.

* * * * *